US012085188B2

(12) United States Patent
Enger et al.

(10) Patent No.: US 12,085,188 B2
(45) Date of Patent: Sep. 10, 2024

(54) T-HANDLE BALL VALVE LOCKOUT

(71) Applicant: Brady Worldwide, Inc., Milwaukee, WI (US)

(72) Inventors: Andrew N. Enger, Muskego, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 18/021,511

(22) PCT Filed: Aug. 20, 2020

(86) PCT No.: PCT/US2020/047158
§ 371 (c)(1),
(2) Date: Feb. 15, 2023

(87) PCT Pub. No.: WO2022/039743
PCT Pub. Date: Feb. 24, 2022

(65) Prior Publication Data
US 2023/0304601 A1 Sep. 28, 2023

(51) Int. Cl.
*F16K 35/10* (2006.01)
(52) U.S. Cl.
CPC .................... *F16K 35/10* (2013.01)
(58) Field of Classification Search
CPC .......... F16K 35/00; F16K 35/06; F16K 35/10; Y10T 70/5615; Y10T 70/5619;
(Continued)

(56) References Cited

U.S. PATENT DOCUMENTS 725,290 A * 4/1903 Speer .................... F16L 19/005
285/80
1,154,389 A * 9/1915 Fogalsang ........... B60R 25/0227
70/2
(Continued)

FOREIGN PATENT DOCUMENTS

WO 9518326 A1 7/1995
WO 2019053496 A1 3/2019

OTHER PUBLICATIONS

Amazon, Tradesafe Gate Valve Lockout—Red Valve Lockout Device, Lockout Tagout Valve Adjustable for 1 inch to 6½ inch Diameter Valve Handles, Industrial Grade Polypropylene, https://www.amazon.com/dp/B08B3DWQ4F?pd_rd_i=B08B3DWQ4F&pf_rd_p=b000e0a0-9e93-480f-bf78-a83c8136dfcb&pf_rd_r=FE1XXR5WF0PAXFG3J5AG&pd_rd_wg=QICN2&pd_rd_w=nFlcG&pd_rd_r=58a0c947-1570-4171-8cfc-832212728053&th=1, Listed on Amazon on Jun. 11, 2020, 5 pages.
(Continued)

*Primary Examiner* — Kenneth Rinehart
*Assistant Examiner* — Jonathan J Waddy
(74) *Attorney, Agent, or Firm* — Quarles & Brady LLP

(57) ABSTRACT

A handle lockout device can be placed around a handle of a valve to prevent operation of the handle by rotation of the handle about a stem. The handle lockout device includes a housing and one or more adjustable slides. The housing has an internal cavity, in which the housing is bifurcated into two halves at a parting line with a stem opening positioned on the housing along the parting line. The two halves are movable relative to one another between an opened position in which the two halves are separated at the parting line to provide access to the internal cavity and a closed position in which the two halves are bought together at the parting line. The adjustable slide(s) are positioned adjacent to the stem (Continued)

opening, are slidable relative to the housing, and have an edge that can alter a size of the stem opening of the housing.

18 Claims, 7 Drawing Sheets

(58) Field of Classification Search
CPC ............ Y10T 70/5624; Y10T 70/5628; Y10T 70/5633; Y10T 70/5637; Y10T 137/7069; Y10T 137/7256
USPC ...... 251/90, 89; 70/175, 176, 177, 178, 179, 70/180; 137/383, 385
See application file for complete search history.

(56) References Cited

U.S. PATENT DOCUMENTS

| | | | |
|---|---|---|---|
| 1,329,913 A * | 2/1920 | McGuire | B60R 25/0227 70/2 |
| 3,476,288 A | 11/1969 | Sherrill | |
| 4,405,161 A | 9/1983 | Young et al. | |
| 5,092,359 A | 3/1992 | Wirth et al. | |
| 5,238,141 A | 8/1993 | Callegari et al. | |
| 6,371,155 B1 * | 4/2002 | Balocca | E03C 1/041 137/382 |
| 7,197,904 B2 * | 4/2007 | Marcelle | G05G 5/28 70/164 |
| 7,752,876 B2 | 7/2010 | Meekma et al. | |
| 11,649,899 B2 * | 5/2023 | Hoots | F16K 5/0647 137/385 |
| 2012/0047973 A1 | 3/2012 | Su et al. | |
| 2017/0051843 A1 * | 2/2017 | Azizgolshani | F16K 35/10 |
| 2018/0017181 A1 | 1/2018 | Ayala, Jr. et al. | |
| 2021/0207736 A1 | 7/2021 | Bhanpurawala et al. | |
| 2021/0207737 A1 * | 7/2021 | Enger | F16K 35/027 |

OTHER PUBLICATIONS

PCT International Search Report and Written Opinion, PCT/US2020/047158, Nov. 20, 2020, 9 pages.

Amazon, Rotating Gate Valve Lockout (for 4"-6½" Valve Handle Diameters), https://www.amazon.com/Induschipice-Rotating-Lockout-Handle-Diameters/dp/B0T1X7CZS/ref=sr_1_2_sspa?crid=UURK0E34T7QK&keywords=t-handle%2Bball%2Bvalve%2Blockout&qid=1676572105&sprefix=t-handle%Bball%2Bvalve%2Blockou%2Caps%C135&sr=8-2-spons&spLa=ZW5jcnlwdGVkUXVhbGlmaWVyPUEyNzU2MEcxSzk5ZJmVuY3J5cHRlZElkPUEwNjY4OTQ4Mk83MlBTNENEQ1BKTyZ . . . , Listed on Amazon on Jun. 16, 2019, 4 pages.

* cited by examiner

T-HANDLE BALL VALVE LOCKOUT

CROSS-REFERENCE TO RELATED APPLICATION

This application represents the U.S. national stage entry of International Application No. PCT/US2020/047158 filed Aug. 20, 2020, entitled "T-Handle Ball Valve Lockout", which is incorporated by reference herein for all purposes.

TECHNICAL FIELD

This disclosure relates to a handle lockout device for handle on a valve such as, for example, a T-handle on a ball valve in which a single handle lockout device can be used to lockout various differently-sized handles.

BACKGROUND

Valve lockout devices are used to prevent changing the state of a valve, such as between a closed position and an opened position. For instance, a valve lockout device may be used to lock a valve in a fully closed position while a technician performs repair or maintenance on a component (e.g., a turbine) that is downstream of the locked-out valve. The valve lockout device provides a visual and a structural impediment to altering the state of the valve by, for instance, blocking access to the control handle of a valve or structurally restricting the physical movement of the control handle.

SUMMARY

One outstanding issue with many lockout devices for valves is that size of the valve—including the handle and the stem—can vary depending on the particular type or style of valve and application. Such variance in sizes and dimensions in the valve and handle to be locked out has made it difficult to produce a single lockout device that would be suitably sized for locking out a wide variety of sizes of valves or handles. This means that manufacturers of valve or handle lockout devices often need to produce various sizes of devices to accommodate a range of sizes of valves/handles. Furthermore, purchasers of such valve/handle lockout devices may need to obtain various lockout devices to cover all of the possible sizes of valves/handles that may need to be locked out as well as to make sure that the particular lockout device that is purchased or is being used is appropriately sized for the particular valve/handle so the lockout device cannot be inappropriately removed or fall off during the duration of the lockout.

Disclosed herein is an improved handle lockout device that overcomes the aforementioned problems. This improved handle lockout device employs one or more adjustable slides connected to the housing or shell of the lockout device. These slide(s) permit a stem opening on the housing to be reduced—but not enlarged—after the lockout device has been attached. This means that the single lockout device can accommodate both large and small handles without the possibility that the lockout device could somehow be angled on a smaller handle in a way that would permit the secured lockout device from being removed from the handle.

According to one aspect, a handle lockout device is disclosed for placement around a handle of a valve to prevent operation of the handle by rotation of the handle about a stem. The handle lockout device includes a housing and one or more adjustable slides. The housing has an internal cavity and is bifurcated into two halves at a parting line with a stem opening positioned on the housing along the parting line. The two halves are movable relative to one another between (1) an opened position in which the two halves are separated at the parting line to provide access to the internal cavity and (2) a closed position in which the two halves are bought together at the parting line. The adjustable slide(s) is/are positioned adjacent to the stem opening and is/are slidable relative to the housing. Each adjustable slide has an edge that, in at least some positions of the adjustable slide relative to the housing, alters a size or profile of the stem opening.

In some forms, the adjustable slide may be freely slidable to make the stem opening smaller in a narrowing direction, but may not be freely slidable to make the stem opening larger in an enlargement direction that is opposite to the narrowing direction. The adjustable slide may be slidable in the enlargement direction only by operation of a release accessible from the interior cavity. With such a construction, once the housing is secured around the handle, the size or profile of the stem opening may be made only smaller and not larger (given the inaccessibly of the release in the closed position) to prevent removal of the handle lockout device.

In some forms, the handle lockout device may include two of the adjustable slides and these adjustable slides may be on opposing sides of the stem opening. Each of the adjustable slides may be on a respective one of the halves of the housing.

In some forms, a side of the housing and a side of the adjustable slide may each have teeth. The teeth can be shaped to permit free sliding of the adjustable slide in a narrowing direction (as previously mentioned and in which the stem opening is made smaller by the edge of the adjustable slide impinging on the stem opening) and in which the teeth are shaped to prevent free sliding of the adjustable slide in an enlargement direction (in which the stem opening is made larger by the edge of the adjustable slide being withdrawn from the stem opening). The teeth may be ratcheting teeth, including ramped surfaces on one side of the teeth and a stop surface on the other side of the teeth. To facilitate movement of a slide in the enlargement direction, the adjustable slide may again include a release depressible only from the inside of the internal cavity of the housing, in which depressing the release causes the teeth of the adjustable slide and the housing to separate from one another, such that the adjustable slide is slidable in the enlargement direction. The release of the adjustable slide may be flush or recessed with respect to an adjacent internal surface of the housing proximate the release. Such a flush or recessed configuration of the release can help prevent the surface of the handle being locked out from being used to engage the release.

In some forms, the housing may be hinged at a hinge between the halves of the housing. The housing may include a lockable structure to facilitate maintaining the housing in the closed position. In one particular form, the lockable structure may include alignable lock openings with at least one of the alignable lock openings on each of the halves of the housing. In such form, in the closed position of the housing, the alignable lock openings may be aligned for reception of a lock (for example, the lock shackle of a padlock or a cable line) to secure the handle lockout device in the closed position until the lock is removed from the lockout device. The lockable structure may be on a side of the housing opposite a side of the housing that supports a hinge connecting the halves of the housing together.

In some forms, the housing may include a pair of grooves or guides into which the adjustable slide is received to guide a sliding movement of the adjustable slide relative to the housing. This movement may be in a generally radial direction towards or away from a central axis or the center of the stem opening.

In some forms, a pair of the adjustable slides may be on opposing sides of the stem opening when the housing is in the closed position.

In some forms, in the closed position of the housing, the stem opening may be the only opening providing access to the internal cavity from an exterior of the housing.

In some forms, the housing may be puck shaped with the stem opening centrally disposed on an axial face thereof.

In some forms, the parting line may include one or more engaging projections and recesses to maintain positional engagement of the halves of the housing along the parting line when the housing is in the closed position.

While various features have been described above, it will be readily apparent and understood that these features can be used in any workable combination or permutation with one another or independently of one another and such workable variations fall within the scope of this disclosure.

According to another aspect, a method is disclosed of using the handle lockout device as described above and herein to lockout a handle of a valve. The handle lockout device, in the opened position, is placed around the handle of the valve and is moved to the closed position around the handle of the valve. The handle lockout device is secured in the closed position, for example, by a lock. The adjustable slide(s) is/are slid to alter the size or profile of the stem opening of the housing to correspond to the stem of the handle of the valve.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 2:
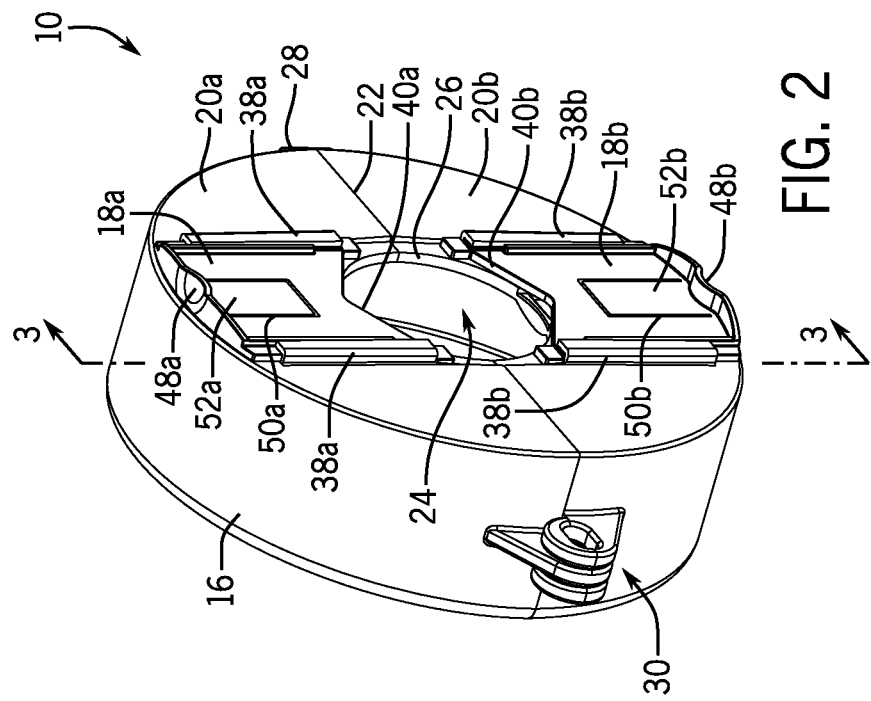
FIG. 2 is a bottom perspective view of the handle lockout device of FIG. 1 in which the two halves are closed.

Referring first to FIGS. 1 through 8, a handle lockout device 10 is illustrated for locking out a handle such as a T-handle 12 for a ball valve 14 as is illustrated later in FIGS. 9 and 10. The handle lockout device 10 primarily includes a housing 16 and adjustable slides 18a and 18b.

Figure 1:
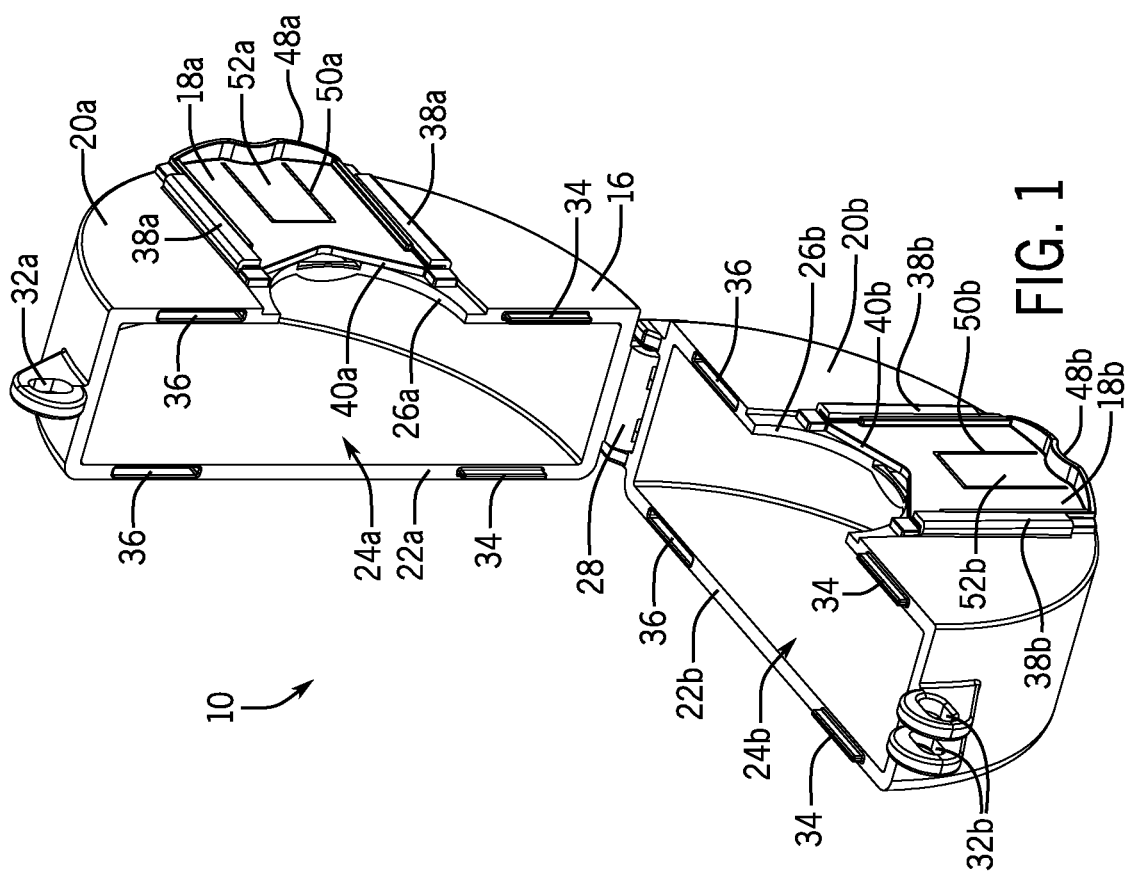
FIG. 1 is a bottom perspective view of the handle lockout device in which the two halves of the handle lockout device are opened with respect to one another.

With initial reference primarily being made to FIGS. 1 and 2 and in the form illustrated, the housing 16 is bifurcated into a pair of half-moon shaped sections or halves 20a and 20b as can be best seen in the opened position of FIG. 1. As illustrated in FIG. 2, when those halves 20a and 20b are closed along a parting line 22 (comprising parting line portions 22a and 22b on the each of the respective halves 20a and 20b), the housing 16 is then generally circular puck-shaped in the closed position. As a practical matter, any angular position of the halves 20a and 20b relative to one another other than the closed position of FIG. 2 may be considered opened; however, in the context of this specification, the opened position will typically refer to a relative position of the halves 20a and 20b in which a handle could be received therebetween.

Figure 3:
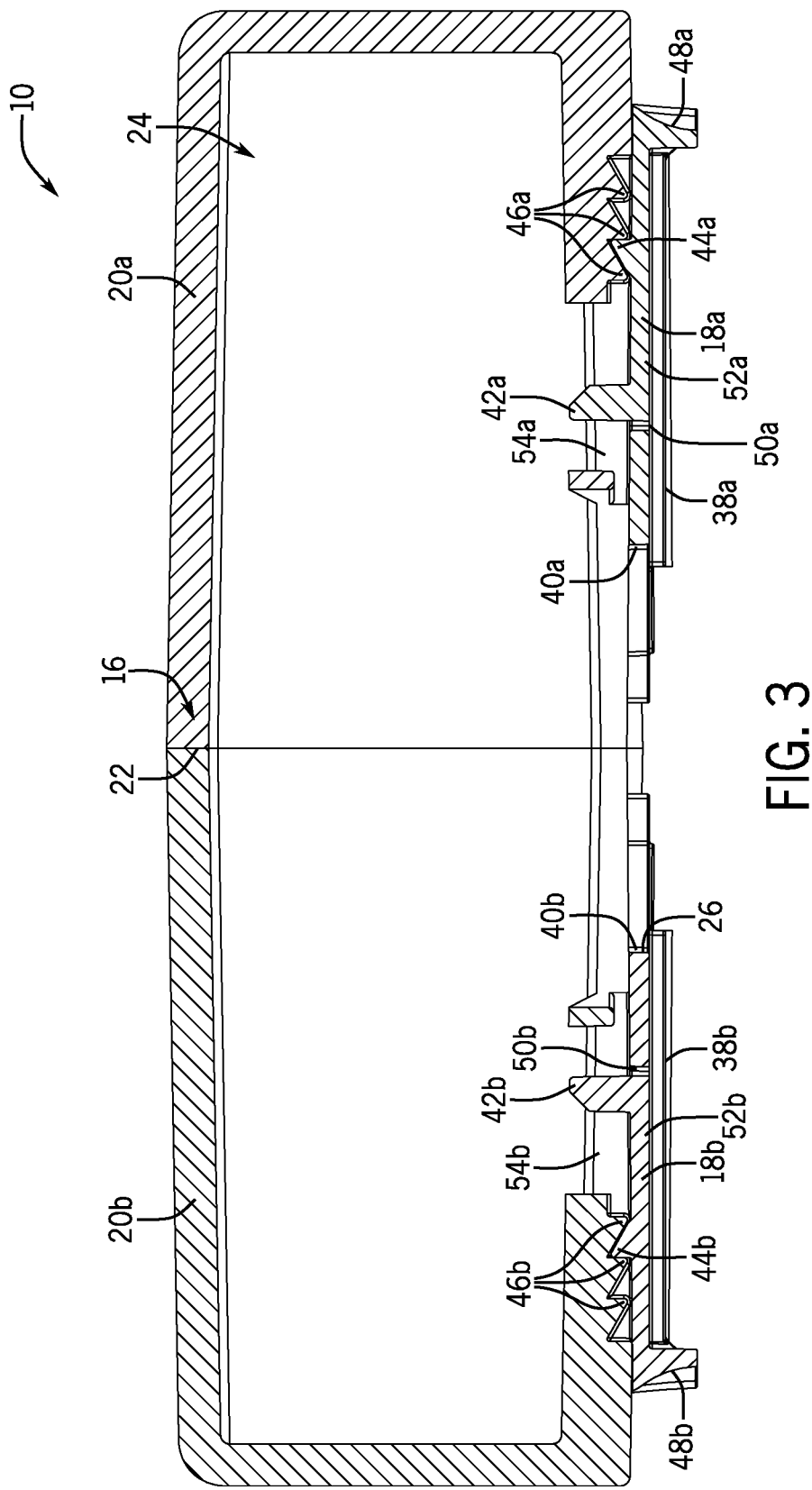
FIG. 3 is a side cross-sectional view of the handle lockout device taken through line 3-3 of FIG. 2 illustrating how the adjustable slides are in sliding and ratcheting toothed engagement with the housing.
Figure 4:
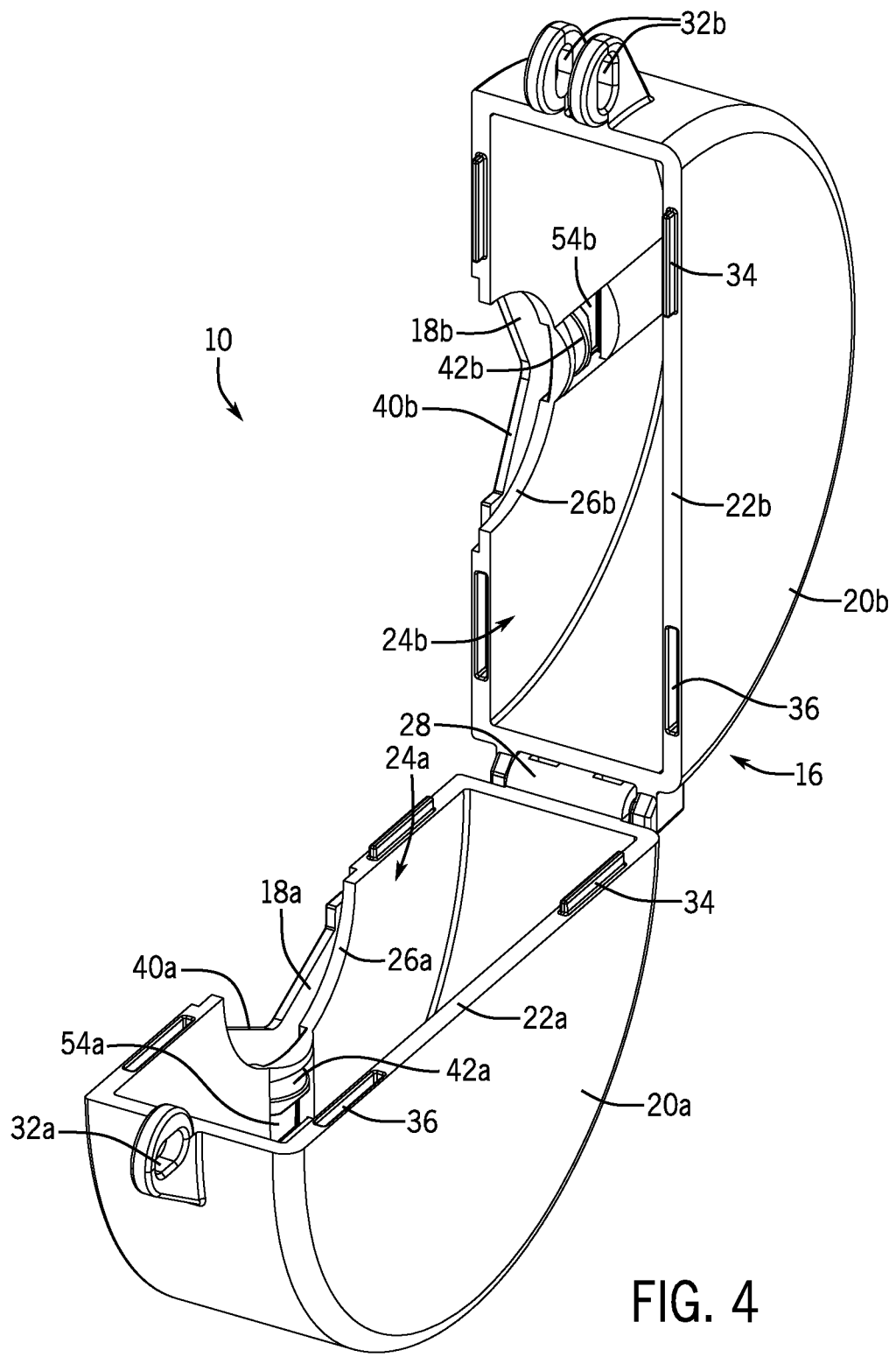
FIG. 4 is a top side perspective view of the handle lockout device in an opened position illustrating the location of the releases on the adjustable slides in the internal cavity.

As can be best seen in FIGS. 1, 3, and 4, the housing 16 and its respective halves 20a and 20b are hollow having thin walls that define an internal cavity 24 which is split among the halves when opened as internal cavity 24a and internal cavity 24b, respectively. This internal cavity 24 is sized and shaped to receive a handle during the use of the handle lockout device 10.

Because the handle to be locked out is connected to a valve that is typically in line with a pipe, the housing 16 also includes a stem opening 26 positioned on the housing 16 along the parting line 22. While the term "stem opening" is used to describe this feature, the so-called "stem" descriptor is used to indicate that the stem opening is present to permit the passage of the stem side of the handle through the lockout device when the handle is positioned in the internal cavity of the handle lockout device. It is contemplated that, when the housing 16 is closed, the stem opening 26 may be the only opening providing access to the internal cavity 24 from the exterior of the housing 16, such that the handle is otherwise inaccessible through the housing 16. As illustrated and similar to other features which are split among the halves 20a and 20b, the stem opening 26 includes stem opening portions 26a and 26b on respective halves 20a and 20b that collectively form the stem opening 26 when the housing 16 is closed and the parting lines portions 22a and 22b are joined. The stem opening 26 of the housing 16 is circular, being formed from two semi-circular sections of the stem opening portions 26a and 26b on the axial faces of the respective halves 20a and 20b, and is centrally positioned on the central axis of the puck shape formed when the housing 16 is closed. As will be described in greater detail below, the size or profile of the stem opening 26 can be altered by the use of one or more adjustable slides 18a and 18b.

To effectuate such movement between the opened and closed positions of the housing 16, the halves 20a and 20b can be joined at a hinge 28 at an angular position along the circumference. As illustrated, the hinge 28 is positioned on the circumference between the axial faces of the halves 20a and 20b of the housing 16 and can be designed in such a way that the hinge 28 cannot be disengaged or tampered with at least while the housing 16 is in the closed position. It is contemplated the hinge 28 could take any of constructions such as, for example, being of a pin-less hinge type in which two hinge half parts can be slid into one another in a direction generally perpendicular to the axis of the hinge while the halves 20a and 20b are in a roughly opened angular position and in which those hinge parts become inseparable after the hinge parts are brought together at a common hinge axis and further rotated at least part way towards the closed position. Still further, it is contemplated that the hinge could be a living hinge or any of a number of other type of hinges without limitation.

Moving 180 degrees around the circumference from the hinge 28 when the handle lockout device 10 is closed to the opposite side, a lockable structure 30 is present. In the particular lockable structure 30 illustrated, the lockable structure 30 includes alignable openings 32 including an alignable opening 32a on the half 20a of the housing 16 and two alignable openings 32b on the half 20b of the housing 16. As can be best seen in FIG. 2, when the halves 20a and 20b are closed together to the closed position, these alignable openings 32 are brought into alignment with one another for the reception of a lock (most likely, a shackle of a pad lock or a cable) that can prevent the handle lockout device 10 from being moved out of the closed position of FIG. 2.

To prevent axial skewing and ensure alignment of the halves 20a and 20b of housing 16 when closed, the projection supporting the alignable opening 32a may be received at an axial position between the two projections supporting the alignable openings 32b. Moreover, the parting line 22 can include one or more projections 34 and recesses 36 that can engage and nest in one another when the parting lines 22a and 22b are brought together to form parting line 22 to maintain positional engagement of the halves 20a and 20b of the housing 16 along the parting line 22 and prevent skewing or misalignment of the halves 20a and 20b.

With the housing 16 having been generally described, the one or more adjustable slides 18a and 18b will now be described in relation to the housing 16. In the particular form illustrated, there are a pair of adjustable slides 18a and 18b, respectively positioned adjacent to the stem opening 26 on the outside axial face of the housing 16. Adjustable slide 18a is on the half 20a of the housing 16, while adjustable slide 18b is on the half 20b of the housing 16.

These adjustable slides 18a and 18b are movable or slidable relative to the housing 16 to alter the size and profile of the stem opening 26 such that a single handle valve lockout 10 can accommodate a variety of sizes of handles. To permit such sliding or movement, as illustrated, each of the halves 20a and 20b have a corresponding set of rails or grooves 38a and 38b that run parallel to, but are spaced from, a radial direction away from the central axis of the housing 16. Lateral sides of the adjustable slides 18a and 18b are then received in the guides 38a and 38b, so that the adjustable slides 18a and 18b are able to be moved in a radial direction relative to the central axis of the housing 16 and stem opening 26. This movement can move an edge 40a and 40b of one or both of the adjustable slides 18a and 18b, respectively into the region of the stem opening 26. The edges 40a and 40b are generally concaved V-shaped so as to permit a reduction or re-sizing of the available profile of the stem opening 26 for corresponding to the size of the base or stem around the handle being locked out.

With additional reference being made to FIG. 3, these adjustable slides 18a and 18b are generally freely slidable in a ratcheting fashion in a direction towards the central axis or stem opening 26, but require operation of a corresponding release 42a and 42b to permit sliding or movement in a direction away from the central axis or stem opening 26.

This ratcheting action is created by the engagement of teeth with ramped portions and stop portions including teeth 44a and 44b on the adjustable slides 18a and 18b (as illustrated one tooth each) and sets of teeth 46a and 46b on the exterior sidewall of the housing 16. When the user pushes the radially outward push edges 48a and 48b of the adjustable slides 18a and 18b to move the adjustable slides 18a and 18b radially inward, the ramped portions of the respective tooth 44a and 44b rides up ramped portions of the teeth 46a and 46b to move the adjustable slides 18a and 18b (and their respective edges 40a and 40b) inward towards the central axis and stem opening 26. After each tip of a ramped surface is passed, the pair of corresponding stop surfaces on the teeth generally prevent radially outward movement of the adjustable slides 18a and 18b as these stop surfaces are generally perpendicular to the direction of motion or sliding of the adjustable slides 18a and 18b.

However, the stop surfaces of the teeth can be disengaged by the depression of the correspond releases 42a and 42b. The releases 42a and 42b are only accessible from the internal cavity 24 of the housing and, upon depression, causes the deflection of the tooth 44a or 44b of respective adjustable slides 18a and 18b so that the stop surfaces of the teeth are temporarily cleared of one another to permit movement of the adjustable slides 18a and 18b in an enlarging direction away from the central axis or stem opening 26. As illustrated there is a U-shaped cut line 50a or 50b, which creates a small deflectable tab 52a or 52b with both a release 42a or 42b and a corresponding tooth 44a or 44b on it. It is thus to be appreciated that there is some amount of inherent material elastic deformability or flexibility in the deflectable tabs 52a and 52b of the adjustable slides 18a and 18b that permits such separation of the teeth to permit movement of the slides 18a and 18b in an enlarging direction upon depression of the respective release 42a and 42b.

As can be seen in FIGS. 3 and 4, the releases 42a and 42b are accessible through slots 54a and 54b in the housing 16 which also provide a space for the releases 42a and 42b to linearly travel within the space of the wall of the housing 16. The releases 42a and 42b are ideally flush with or recessed with respect to the interior surface of the housing 16 in the region of slots 54a and 54b. In this way, any contact between the handle and the interior wall of the housing 16 during use or lockout of a handle cannot depress the release 42a or 42b sufficiently such as to permit the corresponding adjustable slide 18a or 18b the ability to be moved in the enlarging direction.

Figure 5:
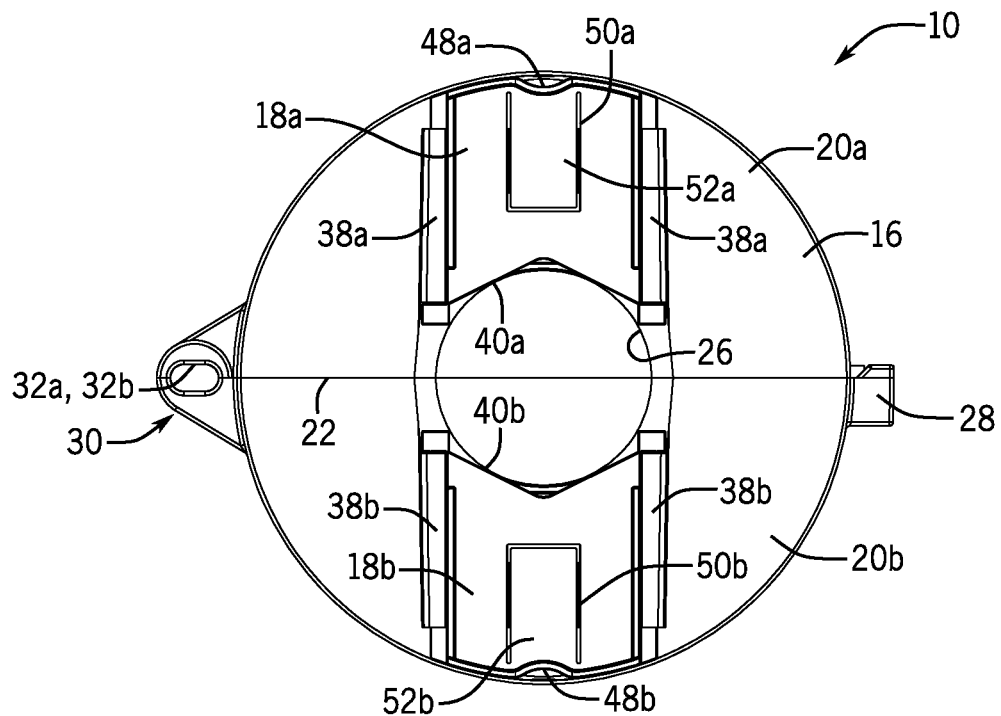
FIGS. 5 to 8 illustrate the adjustable slides in each of the four ratcheting positions from largest in FIG. 5 to smallest in FIG. 8.
Figure 6:
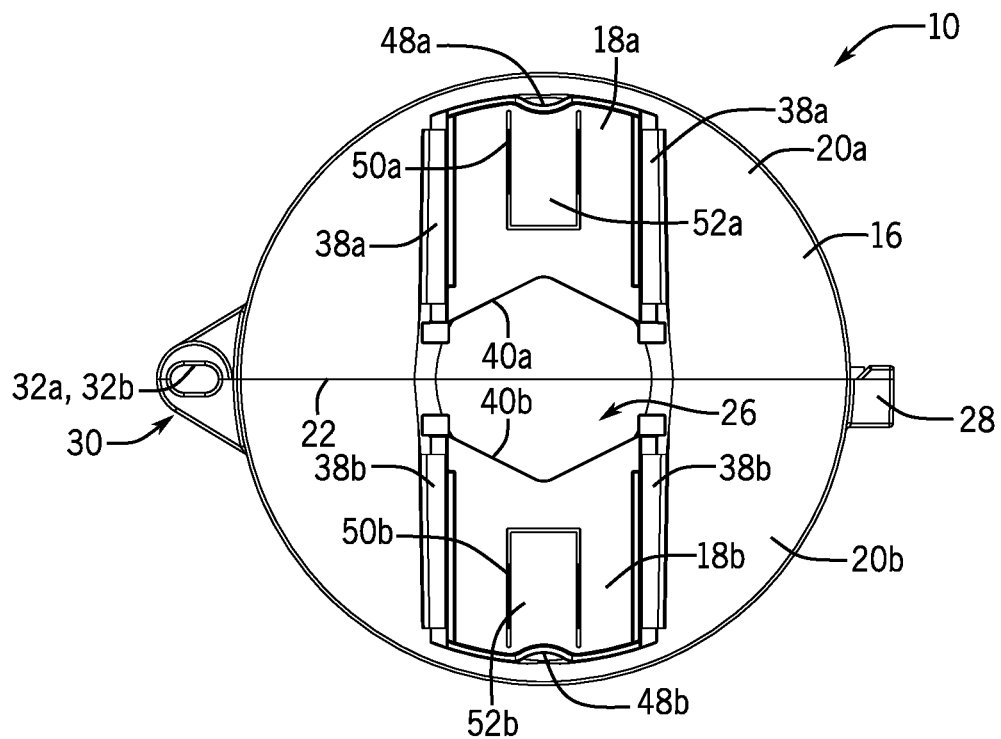
Figure 7:
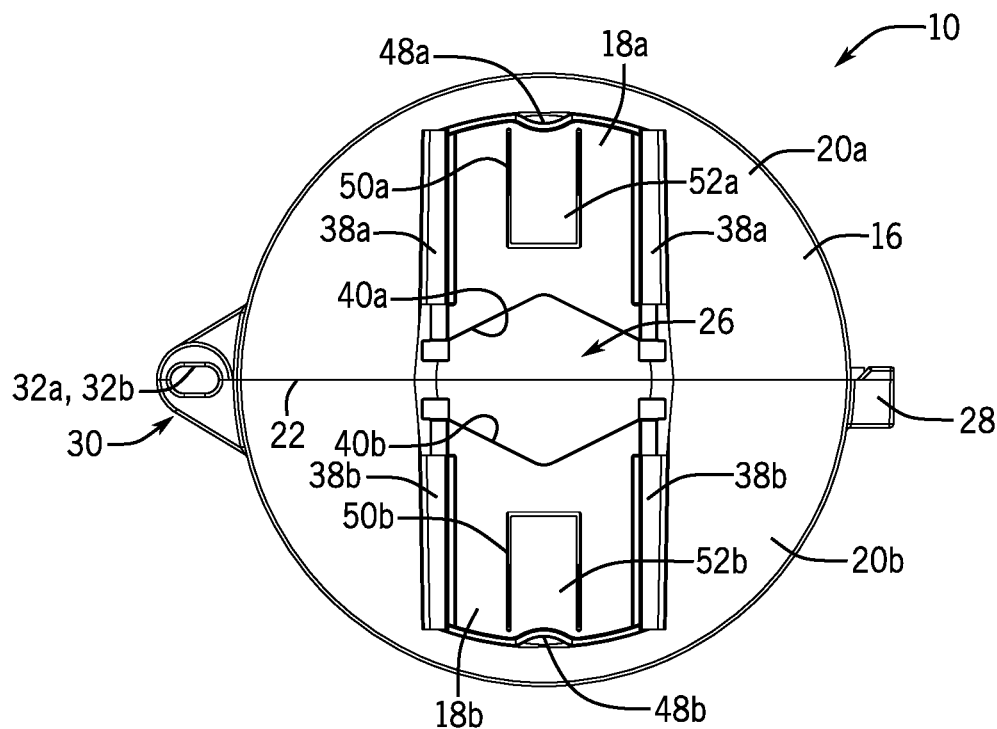
Figure 8:
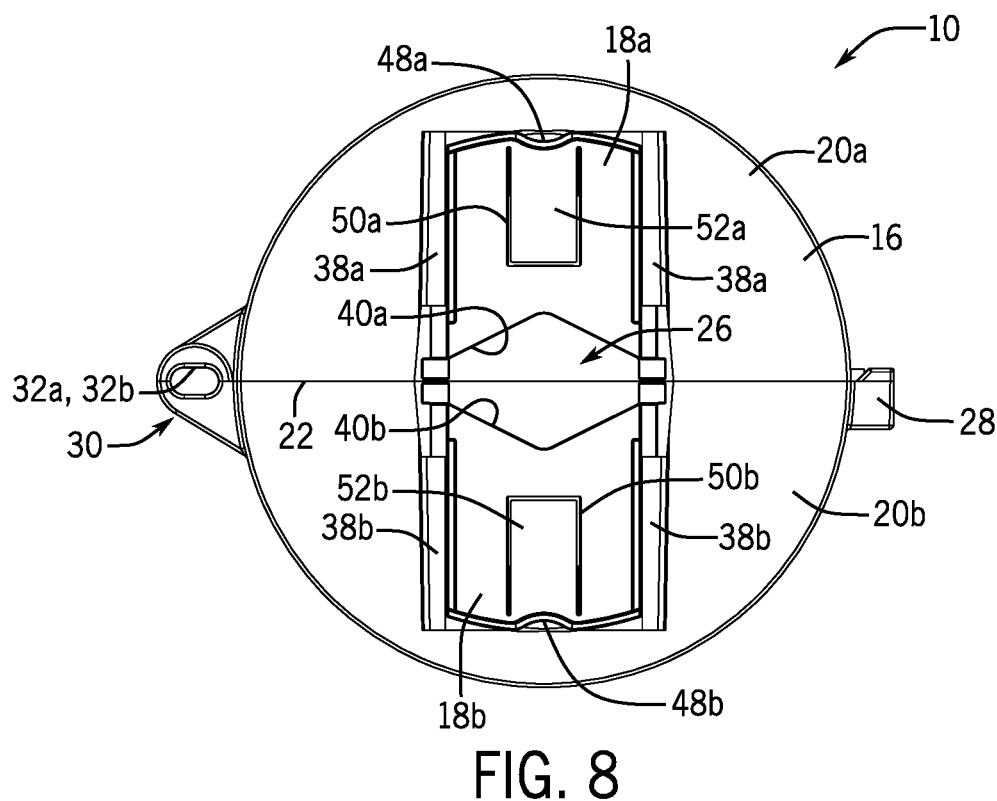

Looking now at FIGS. 5 through 8, various positions of the adjustable slides 18a and 18b can be seen. Because in the exemplary handle lockout device 10 there are four ratcheting positions based on the four teeth 46a and 46b of the halves 20a and 20b, each of FIGS. 5 through 8 represent one of the four discrete positions that the adjustable slides 18a and 18b may be positioned. FIG. 5 represents the largest and most opened position of the stem opening 26, whereas the profile of stem opening 26 become progressively smaller as the edges 40a and 40b encroach on the stem opening 26.

Thus, once the handle lockout device 10 is in the closed positon (and the stem opening 26 already largely blocked by the stem or base of the handle), the adjustable slides 18a and 18b can be moved inward to close around the stem or base of the handle, but not outward again without the opening of the handle lockout device 10 to access to the releases 42a and 42b via the internal cavity 24a and 24b.

While two opposing adjustable slides 18a and 18b have been illustrated in which the slides 18a and 18b are moved inward together in stepwise fashion, it should be appreciated that this disclosure is not so limited. For instance, there could be a different number of adjustable slides including one, three, or four just for example. Any number of slides could potentially perform the size and profile adjustment function and the two slides are merely representative. Further still, it will be readily appreciated that when there are multiple slides, the slides are operable independently of one another. While in many instances the slides can be brought together uniformly, they need not be operated in a symmetric or similar manner. Still further, while four teeth are shown as part of the housing and one on a flexible plank, there may be more teeth to accommodate more positions, few teeth, or different numbers of teeth on the various parts than those illustrated. For example, there could be two teeth on the flexible plank or tab portion of the slide to ensure a better locking engagement.

Figure 9:
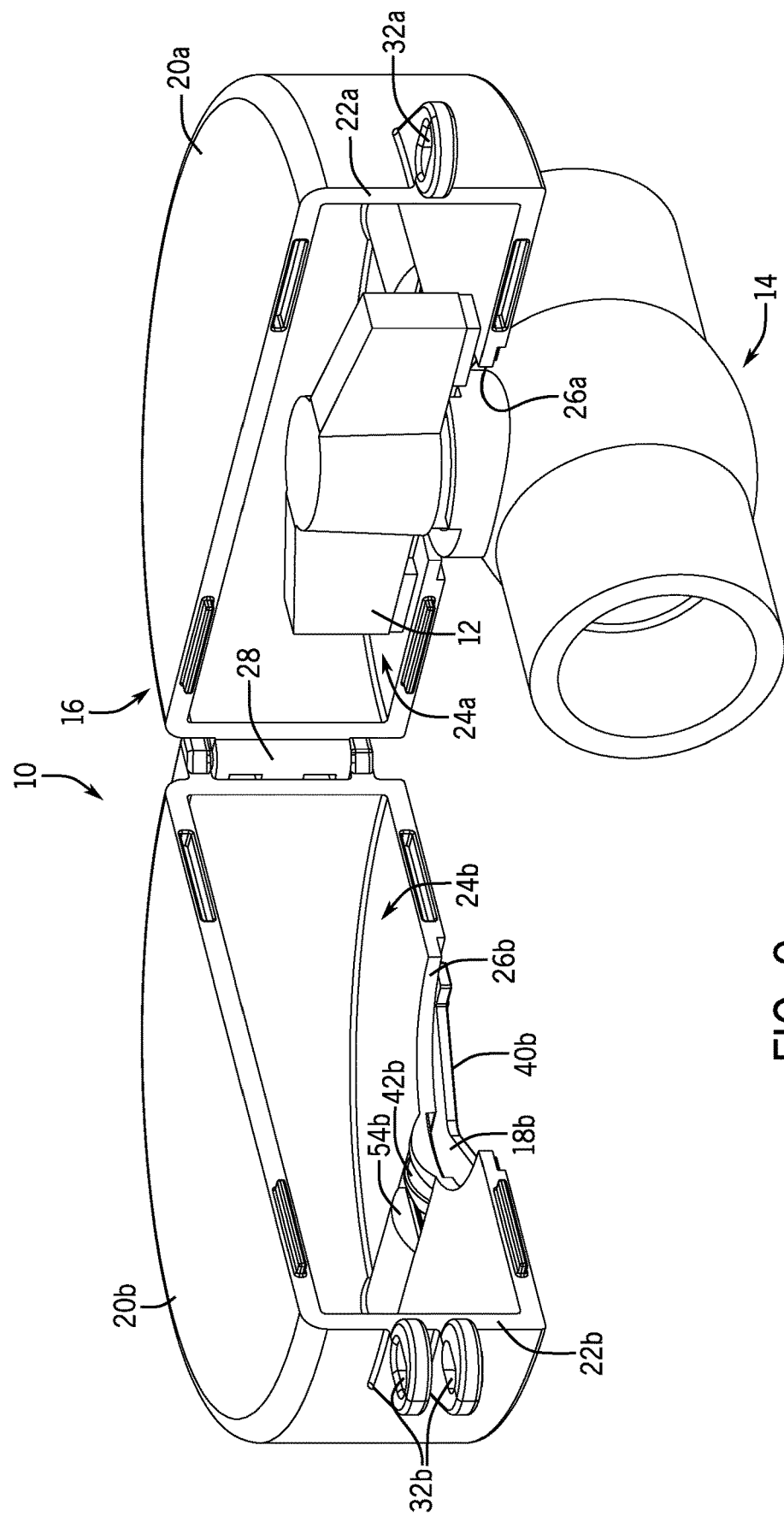
FIG. 9 is an environmental view of the placement of the handle lockout device around a T-handle valve while the handle lockout device is in the opened position.
Figure 10:
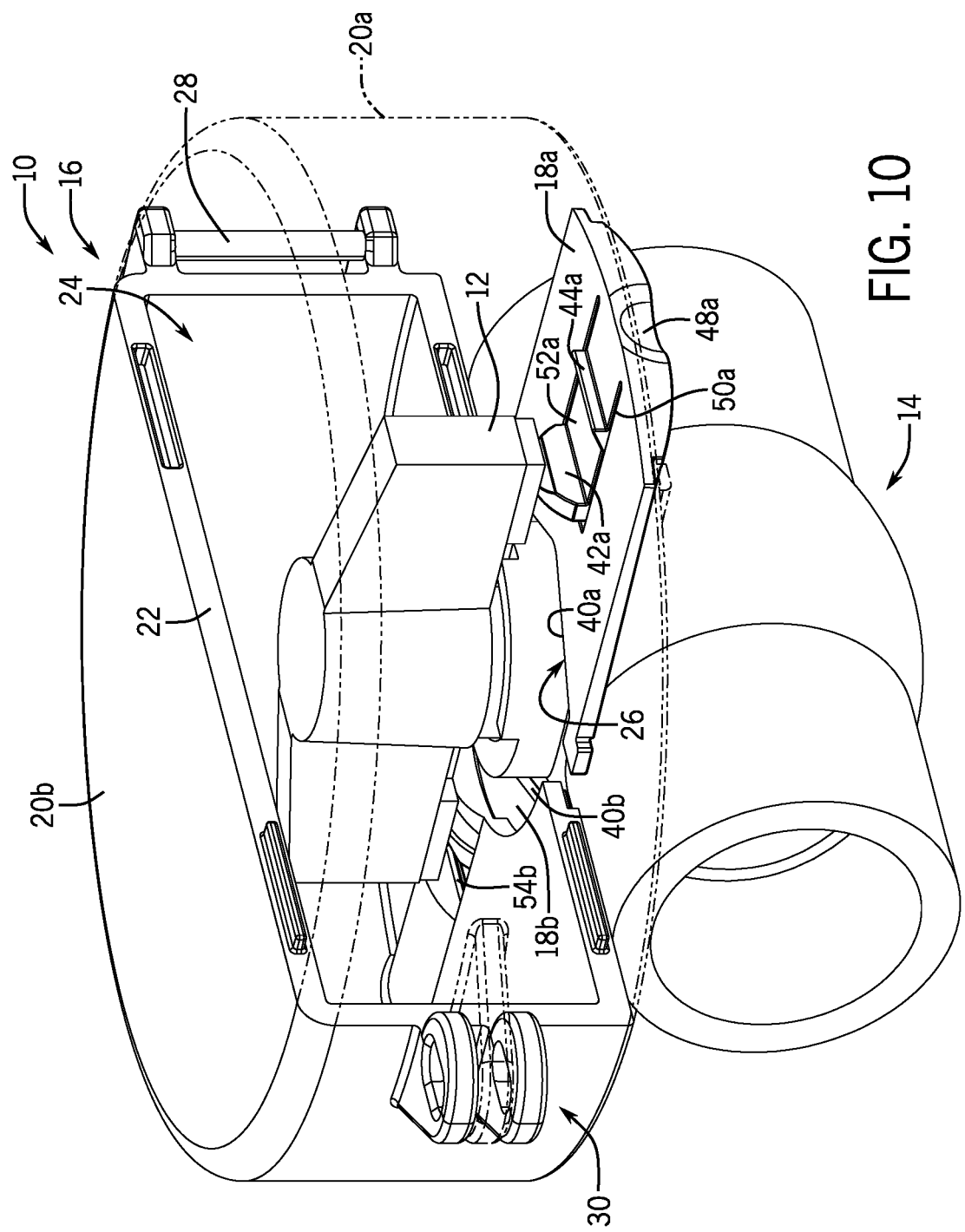
FIG. 10 is an environmental view of the handle lockout device around the T-handle valve of FIG. 9, but after the handle lockout device has been closed and the adjustable slides adjusted to correspond to the size of the stem or lower portion of the valve handle.

Looking finally at FIGS. 9 and 10, the attachment of the handle lockout device 10 to an exemplary T-handle 12 is illustrated in greater detail to illustrate the process of attachment and locking out.

As illustrated in FIG. 9, the handle lockout device 10 is moved to an open position and the handle 12 is placed in the internal cavity 24a and/or 24b with the stem openings 26a and/or 26b being generally located about the base or stem of the handle 12. With the handle 12 positioned generally within the internal cavity 24a and 24b, the halves 20a and 20b of the housing 16 are closed to the closed position shown in FIG. 10 in which the lockable structure 30 is in a position so as to be potentially locked, for example, by the insertion of the shackle of a padlock (not shown) though the alignable openings 32. In this closed position, the adjustable slides 18a and 18b can be pushed inward to move the edges 40a and 40b into close engagement with the size and/or profile of the stem or base of the handle 12 and valve 14. Some or all of this inward adjustment of the slides 18a and 18n can potentially be done before the handle lockout device 10 is moved to the closed position; however, to avoid possible undersizing of the stem opening 26, it may be preferable to only make the adjustment after the handle lockout device 10 is closed and attached. With the handle lockout device 10 secured by a lock and fitted about the stem and/or base by the slides 18a and 18b, the handle lockout device 10 cannot be readily removed and the handle 12 cannot be rotated. Only after the lock is removed may the halves 20a and 20b of housing 16 be re-opened, the housing 16 removed from the handle 12 to provide access to the handle 12 for operation, and the releases 42a and 42b made accessible so that the slides 18a and 18b be moved out to enlarge the size or profile of the stem opening 26 for use on a larger handle or valve.

Thus, a single handle lockout device is provided which may be adjusted to accommodate a variety of handle sizes so that multiple differently sized lockout devices are not required for differently sized handles. Moreover, despite having this adjustability, the handle lockout device cannot be readily removed from a small handle when in a closed and locked out position by virtue of the adjustability, as the opening profiles can only be made smaller and not larger when the device is closed.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A handle lockout device for placement around a handle of a valve to prevent operation of the handle by rotation of the handle about a stem, the handle lockout device comprising:
   a housing having an internal cavity, in which the housing is bifurcated into two halves at a parting line with a stem opening positioned on the housing along the parting line, wherein the two halves are movable relative to one another between an opened position in which the two halves are separated at the parting line to provide access to the internal cavity and a closed position in which the two halves are brought together at the parting line;
   an adjustable slide positioned adjacent to the stem opening and slidable relative to the housing, the adjustable slide having an edge that, in at least some positions of the adjustable slide relative to the housing, alters a size of the stem opening wherein the adjustable slide is freely slidable to make the stem opening smaller in a narrowing direction, but is not freely slidable to make the stem opening larger in an enlargement direction that is opposite to the narrowing direction.

2. The handle lockout device of claim 1, wherein the adjustable slide is slidable in the enlargement direction only by operation of a release accessible from the interior cavity.

3. The handle lockout device of claim 1, wherein the housing is hinged at a hinge between the halves of the housing.

4. The handle lockout device of claim 3, wherein the housing includes a lockable structure to facilitate maintaining the housing in the closed position.

5. The handle lockout device of claim 4, wherein the lockable structure includes alignable lock openings with at least one of the alignable lock openings on each of the halves of the housing in which, in the closed position of the housing, the alignable lock openings are aligned for reception of a lock to secure the handle lockout device in the closed position until the lock is removed therefrom.

6. The handle lockout device of claim 5, wherein the lockable structure is on a side of the housing opposite a side of the housing that supports the hinge connecting the halves of the housing together.

7. The handle lockout device of claim 1, wherein the housing includes a pair of grooves into which the adjustable slide is received to guide a sliding movement of the adjustable slide relative to the housing.

8. The handle lockout device of claim 1, wherein, in the closed position of the housing, the stem opening is the only opening providing access to the internal cavity from an exterior of the housing.

9. The handle lockout device of claim 1, wherein the housing is cylindrically shaped with the stem opening centrally disposed on an axial face thereof.

10. The handle lockout device of claim 1, wherein the parting line includes one or more engaging projections and recesses to maintain positional engagement of the halves of the housing along the parting line when the housing is in the closed position.

11. A method of using the handle lockout device of claim 1 to lockout a handle of a valve, the method comprising:
   placing the handle lockout device in the opened position around the handle of the valve;
   moving the handle lockout device to the closed position around the handle of the valve;
   securing the handle lockout device in the closed position; and sliding the adjustable slide to alter the size of the stem opening of the housing to correspond to the stem of the handle of the valve.

12. A handle lockout device for placement around a handle of a valve to prevent operation of the handle by rotation of the handle about a stem, the handle lockout device comprising:

a housing having an internal cavity, in which the housing is bifurcated into two halves at a parting line with a stem opening positioned on the housing along the parting line, wherein the two halves are movable relative to one another between an opened position in which the two halves are separated at the parting line to provide access to the internal cavity and a closed position in which the two halves are brought together at the parting line;

an adjustable slide positioned adjacent to the stem opening and slidable relative to the housing, the adjustable slide having an edge that, in at least some positions of the adjustable slide relative to the housing, alters a size of the stem opening;

wherein the handle lockout device includes two of the adjustable slides and wherein the adjustable slides are on opposing sides of the stem opening.

13. The handle lockout device of claim 12, wherein each of the adjustable slides are on a respective one of the halves of the housing.

14. A handle lockout device for placement around a handle of a valve to prevent operation of the handle by rotation of the handle about a stem, the handle lockout device comprising:

a housing having an internal cavity, in which the housing is bifurcated into two halves at a parting line with a stem opening positioned on the housing along the parting line, wherein the two halves are movable relative to one another between an opened position in which the two halves are separated at the parting line to provide access to the internal cavity and a closed position in which the two halves are brought together at the parting line;

an adjustable slide positioned adjacent to the stem opening and slidable relative to the housing, the adjustable slide having an edge that, in at least some positions of the adjustable slide relative to the housing, alters a size of the stem opening;

wherein a side of the housing and a side of the adjustable slide each have teeth in which the teeth are shaped to permit free sliding of the adjustable slide in a narrowing direction in which the stem opening is made smaller by the edge of the adjustable slide impinging on the stem opening and in which the teeth are shaped to prevent free sliding of the adjustable slide in an enlargement direction in which the stem opening is made larger by the edge of the adjustable slide being withdrawn from the stem opening.

15. The handle lockout device of claim 14, wherein the teeth are ratcheting teeth including ramped surfaces on one side of the teeth and a stop surface on the other side of the teeth.

16. The handle lockout device of claim 14, wherein the adjustable slide includes a release depressible only from the inside of the internal cavity of the housing, in which depressing the release causes the teeth of the adjustable slide and the housing to separate from one another, such that the adjustable slide is slidable in the enlargement direction.

17. The handle lockout device of claim 16, wherein the release of the adjustable slide is flush or recessed with respect to an adjacent internal surface of the housing proximate the release.

18. A handle lockout device for placement around a handle of a valve to prevent operation of the handle by rotation of the handle about a stem, the handle lockout device comprising:

a housing having an internal cavity, in which the housing is bifurcated into two halves at a parting line with a stem opening positioned on the housing along the parting line, wherein the two halves are movable relative to one another between an opened position in which the two halves are separated at the parting line to provide access to the internal cavity and a closed position in which the two halves are brought together at the parting line;

an adjustable slide positioned adjacent to the stem opening and slidable relative to the housing, the adjustable slide having an edge that, in at least some positions of the adjustable slide relative to the housing, alters a size of the stem opening;

wherein a pair of the adjustable slides are on opposing sides of the stem opening when the housing is in the closed position.

* * * * *